Jan. 2, 1968   A. S. LAMBURN   3,361,222
POWER TRANSMISSION SYSTEM
Filed March 31, 1966                                7 Sheets-Sheet 1

INVENTOR:-
ALAN SALISBURY LAMBURN
BY:- Glascock, Downing & Seebold
ATTORNEY

Jan. 2, 1968  A. S. LAMBURN  3,361,222

POWER TRANSMISSION SYSTEM

Filed March 31, 1966  7 Sheets-Sheet 3

INVENTOR:-
ALAN SALISBURY LAMBURN
BY:- Glaswick, Downing & Subold
ATTORNEY

Jan. 2, 1968  A. S. LAMBURN  3,361,222

POWER TRANSMISSION SYSTEM

Filed March 31, 1966  7 Sheets-Sheet 4

INVENTOR:-
ALAN SALISBURY LAMBURN
BY: Glascock, Downing & Seebold
ATTORNEY

Jan. 2, 1968   A. S. LAMBURN   3,361,222
POWER TRANSMISSION SYSTEM
Filed March 31, 1966   7 Sheets-Sheet 6

INVENTOR:-
ALAN SALISBURY LAMBURN
BY:- Glascock, Downing + Seebold
ATTORNEY

Jan. 2, 1968  A. S. LAMBURN  3,361,222
POWER TRANSMISSION SYSTEM
Filed March 31, 1966  7 Sheets-Sheet 7

INVENTOR:-
ALAN SALISBURY LAMBURN
BY:- Glascock, Downing & Seebold
ATTORNEY

United States Patent Office 3,361,222
Patented Jan. 2, 1968

3,361,222
POWER TRANSMISSION SYSTEM
Alan Salisbury Lamburn, Kencott, via Lechlade, England, assignor, by mesne, assignments, to Auto Transmissions Limited, London, England, a British company
Filed Mar. 31, 1966, Ser. No. 539,025
Claims priority, application Great Britain, Mar. 31, 1965, 13,616/65
2 Claims. (Cl. 180—44)

ABSTRACT OF THE DISCLOSURE

In a vehicular transmission system, an auxiliary change-speed gearing has power input and output shafts one of which is fast with a universal shaft coupling and the other is fast with one end of a propeller shaft. The other end of the propeller shaft is fast with another universal shaft coupling radically located by a member to which it is drivingly connected. A resilient mounting connects the casing of the auxiliary change-speed gearing to the vehicle chassis frame to resist the torsional reaction generated by the auxiliary change-speed gearing.

---

The invention relates to the arrangement of an auxiliary change-speed gearing in a vehicular power transmission system and is particularly, but not exclusively, concerned with a vehicular power transmission system of the kind in which a prime mover and a main change-speed gearing are arranged at one end of a vehicle and are arranged to drive a final drive axle at the other end of the vehicle through a propeller shaft.

It is well-known for an auxiliary change-speed gearing to be carried by the casing of the main change-speed gearing so that the power output member of the main change-speed gearing drives the power input member of the auxiliary change-speed gearing and so that the power output member of the auxiliary change-speed gearing drives the propeller shaft. It has been proposed in U.S. Patent No. 3,315,544 that an auxiliary change-speed gearing should be carried by the casing of the final drive axle so that the power input member of the final drive axle will be driven by the power output member of the auxiliary change-speed gearing and so that the power input member of the auxiliary change-speed gearing will be driven by the propeller shaft.

Auxiliary change-speed gearings are usually two-speed epicyclic gearings providing optionally a direct drive ratio or a planetary ratio, and the planetary ratio can be arranged to give either a multiplication ratio so that the auxiliary gearing constitutes an overdrive, or to give a reduction ratio so that the auxiliary gearing constitutes an underdrive. The majority of motor vehicles are designed to have only a single change-speed gearing arranged between their prime mover and final drive axle, and auxiliary change-speed gearings are offered as optional extras, the principal role of the overdrive being to reduce the speed of the prime mover for a given road speed so that fuel consumption is improved, and the principal role of the underdrive being to increase the speed of the prime mover for a given road speed so that a greater torque can be applied to the road wheels. The application of an auxiliary gearing to each different design of vehicle constitutes an individual engineering task as it is necessary to insert the auxiliary gearing in the existing power transmission system with the minimum of reorganisation or alteration of the standard components and, at the same time, avoiding any possible fouling of the vehicle chassis frame or other components. Whilst it is usually very easy to insert an auxiliary gearing into the majority of conventional vehicle designs using well-established techniques or the invention set out in the aforesaid patent, problems do occur with some forms of vehicle design.

In particular problems occur with some high performance vehicles having their propeller shaft formed in two parts of which the adjacent ends are interconnected by a universal joint and the remote ends are connected by universal joints respectively to the power output member of the main change-speed gearing and to the power input member of the final drive axle, and the centre portion of the two-part propeller shaft is supported by a steady bearing which is carried by the vehicle chassis frame through a flexible mounting. This type of two-piece propeller shaft is extremely useful in itself as it obviates whirling problems by spanning the gap between the main change-speed gearing and the final drive axle with two short aligned and independently supported propeller shafts instead of utilising a single conventional propshaft which would be of substantially twice the length and would accordingly be most susceptible to whirling. If an auxiliary change-speed gearing is arranged in either of the hitherto proposed positions, that is either between the main change-speed gearing and the propeller shaft or between the propeller shaft and the final drive axle, the overall length of the propeller is reduced slightly by the axial length of the auxiliary change-speed gearing, but this reduction in length is usually insufficient to enable a conventional single propeller shaft to be employed. It would accordingly be necessary to redesign the two-part propeller shaft and this would probably involve moving the flexible mounting for the centre portion of the two-part propeller shaft thereby necessitating arranging an alternative attachment point for the flexible mounting to the vehicle chassis frame. Furthermore it is sometimes impossible to arrange the auxiliary change-speed gearing in either of the said hitherto proposed positions due to the presence of structural members of the vehicle chassis frame.

It is one object of this invention to enable an auxiliary change-speed gearing to be inserted in the power transmission system of a motor vehicle having a two-part propeller shaft of the type just described without encountering any of these disadvantages. Another object of this invention is to enable an auxiliary change-speed gearing to be inserted in a cheap and easy manner in the power transmission system of a motor vehicle.

According to one aspect of the invention an auxiliary change-speed gearing is completely enclosed by a casing means and has a power input shaft extending from a first shaft coupling means into the casing means for driving the auxiliary change-speed gearing, a power output shaft for being driven by the auxiliary change-speed gearing extending out of the casing means to a second shaft coupling means, the power output shaft is coaxial with the power input shaft, bearings support the power input and outut shafts from the casing means, oil seals are arranged operatively between the casing means and the power input and output shafts, and mounting means is provided on the casing means so that the latter can be mounted resiliently to the vehicle chassis frame whereby the mounting means will transmit all torque reactions generated on the casing means to the vehicle chassis frame. Throughout the specification and claims the words "chassis frame" are intended to embrace a rigid framework on which the vehicle is constructed, a load bearing body member, or any equivalent components. Preferably, at least one of the coupling means is a universal drive coupling.

According to another aspect of the invention a vehicular power transmission system has a prime mover and a main change-speed gearing arranged at one end of the vehicle, a final drive axle is arranged at the other end of the vehicle, the prime mover is adapted to drive the power input member of the main gearing, an auxiliary change-speed gearing completely enclosed by a casing means is arranged intermediate the main gearing and the final drive axle, a power input shaft and a power output shaft for the auxiliary gearing are supported coaxially from the casing means by respective bearings, oil seals are arranged operatively between the casing means and the power input and output shafts, mounting means connects the casing means resiliently to the vehicle chassis frame to resist the torsional reaction generated by the auxiliary gearing on the casing means, the prime mover and the main gearing are mounted resiliently from the vehicle chassis frame independently of the casing means, a universal drive coupling is drivingly secured to the power input shaft of the auxiliary gearing and is arranged to be driven by the power output shaft of the main gearing, and another universal drive coupling is drivingly secured to the power output shaft of the auxiliary gearing and is arranged to drive the power input shaft of the final drive axle. In the case of a vehicle having a two-part propeller shaft, a propeller shaft may have one end drivingly connected to one of the two said universal drive couplings whereby the propeller shaft the said one universal drive coupling the auxiliary gearing and its power input and output shafts constitute a two-part propeller shaft of which the said one universal drive coupling is supported from the vehicle chassis frame by the said bearings, the casing means of the auxiliary gearing and its said resilient mounting to the vehicle chassis frame, a third universal drive coupling is drivingly connected to the other end of the propeller shaft, and the third universal drive coupling and the other of the said two universal drive couplings constitute a pair of universal drive couplings arranged one at each end of the two-part propeller shaft and are secured one to the power output shaft of the main gearing and the other to the power input shaft of the final drive axle.

According to a further feature a spring means may be arranged to react between the casing means of the auxiliary gearing and the vehicle chassis frame to support at least a proportion of the weight of the auxiliary gearing from the vehicle chassis frame, thereby relieving some of the load acting on the mounting means resiliently connecting the auxiliary gearing to the vehicle chassis frame. Preferably the mounting means, which is primarily arranged as aforesaid for resisting the torsional reaction generated on the casing, may additionally be arranged to allow resilient movement of the auxiliary gearing longitudinally of the vehicle chassis frame. The mounting means may comprise a transversely directed member secured at or adjacent its centre to the casing means and having its ends secured to the vehicle chassis frame through resilient mountings.

According to a further aspect of the invention, a vehicular power transmission system may be arranged to split the torque transmitted from the main gearing between two power output members, one of said output members is arranged to drive at least one road wheel through a driveshaft, an auxiliary change-speed gearing completely enclosed by a casing means is arranged operatively between the other of said output members and at least one further road wheel, a power input shaft and a power output shaft for the auxiliary gearing are supported coaxially from the casing means by respective bearings, oil seals are arranged operatively between the casing means and the power input and output shafts, a mounting means connects the casing means resiliently to the vehicle chassis frame to resist the torsional reaction generated by the auxiliary gearing on the casing means, the differential gearing is mounted resiliently from the vehicle chassis frame independently of the casing means, a universal drive coupling is drivingly secured to the power input shaft of the auxiliary gearing and is arranged to be driven by the other of said output members, and another universal drive coupling is drivingly secured to the power output shaft of the auxiliary gearing and is arranged to drive the said further road wheel. The differential gearing may be connected to be driven by a final drive gearing in a final drive axle, the said drive shaft is connected to drive a first independently suspended road wheel, and the auxiliary gearing together with its power input and output shafts and associated universal drive couplings is connected to drive a second independently suspended road wheel coaxial with the said first road wheel. Alternatively, the differential gearing may be connected to be driven from the main gearing, the said drive shaft is connected to drive a first final drive axle, and the auxiliary gearing together with its power input and output shafts and associated universal drive couplings is connected to drive a second final drive axle. Preferably, a telescopic drive means is operatively arranged in one of said shafts intermediate said coupling means whereby the coupling means can be moved axially to a limited extent relatively to each other.

The invention is now described, by way of example only, with reference to the accompanying drawings, in which.

Throughout the description of the various drawings, the same reference numerals have been employed to denote equivalent components.

Figure 1:
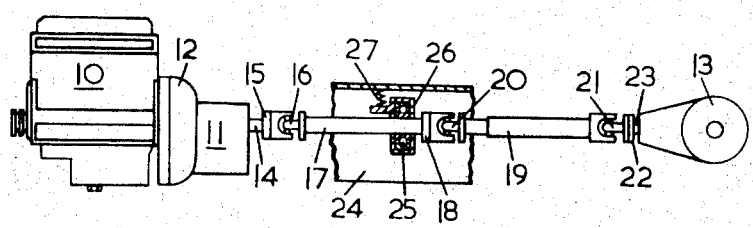
FIGURE 1 is a diagrammatic side elevation of a vehicular power transmission system of a known type showing a fragment of the vehicle chassis frame.

In FIGURE 1, an internal combustion piston engine 10 drives a main change-speed gearing 11 through a clutch arranged in a bell-housing 12. The engine 10 and the main gearing 11 are resiliently mounted in a manner well-known in the art from the chassis frame at the front end of the vehicle, and a final drive gearing is arranged within a banjo-type housing 13 which is resiliently mounted in a well-known manner from the chassis frame at the rear end of the vehicle through suitable unshown road springs and shock absorbers. The main gearing 11 has a power output shaft 14 provided with a driving flange 15 secured by nuts and bolts in the usual manner to a universal drive coupling 16 that is drivingly connected to the front end of a tubular drive shaft 17 of which the rear end is provided with a driving flange 18. A telescopic drive shaft 19 is drivingly connected at its front end to a universal drive coupling 20 secured by nuts and bolts to the driving flange 18, and is drivingly connected at its rear end to a universal drive coupling 21 which is secured by nuts and bolts to a driving flange 22 drivingly connected to a power input shaft 23 for the final drive gearing in housing 13. The tubular drive shaft 17 and the telescopic drive shaft 19 form a two-part propeller shaft that is accommodated in a propeller shaft tunnel 24 which is formed as part of the flooring to the passenger compartment of the vehicle and is carried by the vehicle chassis frame. Due to the presence of the centre universal drive coupling 20, a steady bearing 25 is arranged to support the drive shaft 17 adjacent its driving flange 18 from a yoke 26 which is mounted resiliently in a well-known manner from an unshown bracket secured to the opposite walls of the tunnel 24, and a tension coil spring 27 is arranged to act between the yoke 26 and the roof of the tunnel to support the weight of the drive shafts 17 and 19. The power transmission system described to this point is well-known and the object of the two-part propeller shaft is to reduce whirling problems. However, it should be noted that the assembly of components from the engine 10 to the driving flange 18 is axially rigid although the shaft 17 is capable of limited angular deflection about the universal drive coupling 16, and that the telescopic shaft 19 accommodates changes in axial distance between the universal drive couplings 20 and 21 due to suspension movements of the final drive housing 13.

Figure 2:
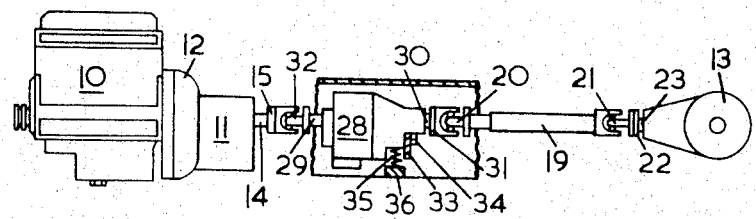
FIGURE 2 illustrates the insertion of one form of auxiliary change-speed gearing into the power transmission system of FIGURE 1 in accordance with one feature of the present invention.

FIGURE 2 is generally similar to FIGURE 1 and accordingly the same reference numerals have been used to identify the common components. In order to modify the transmission system of FIGURE 1 into that shown in FIGURE 2, the universal drive couplings 16 and 20 have been detached from their respective driving flanges 15 and 18, the spring 27 has been detached from the propeller shaft tunnel 24 and the yoke 26 has been detached from its bracket so that the shaft 17 and all its fittings and mountings has been removed. In its place, as indicated in FIGURE 2, a specially arranged auxiliary epicyclic overdrive gearing 28 has been fitted. Full details of the auxiliary gearing 28 will be appreciated from FIGURES 3 to 6, but it should first be noted from FIGURE 2 that the auxiliary gearing is provided with a power input shaft 29 and an aligned power output shaft 30 provided with a driving flange 31 which is secured to the universal drive coupling 20 in the same manner that the driving flange 18 was secured, and that the power input shaft 29 is drivingly secured to a universal drive coupling 32 which is secured to the driving flange 15 in the same manner that the universal drive coupling 16 was secured. Furthermore, a yoke 33 is secured to the casing of the auxiliary gearing by bolts 34 and is mounted resiliently from a bracket secured to the opposite walls of the propeller shaft tunnel 24, and a compression coil spring 35 reacts between the casing of the auxiliary gearing 28 and a bracket 36 secured to the opposite walls of the propeller shaft tunnel so that the weight of the auxiliary gearing is at least partially relieved from the yoke 33 and its associated resilient mountings.

Figure 3:
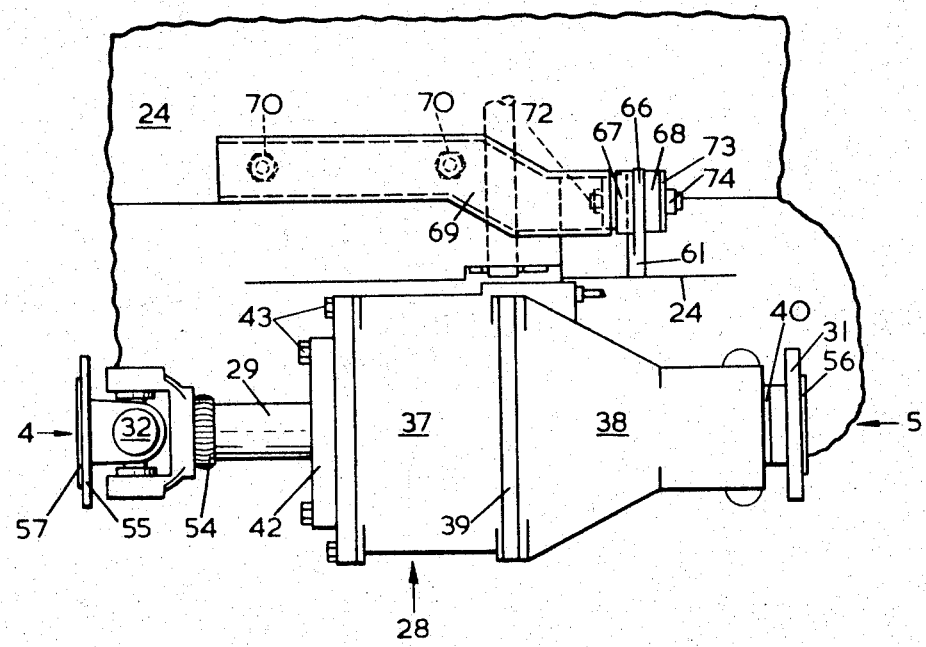
FIGURE 3 is an underplan view to an enlarged scale of the auxiliary change-speed gearing shown in FIGURE 2, but omitting part of the mounting for the auxiliary gearing.
Figure 4:
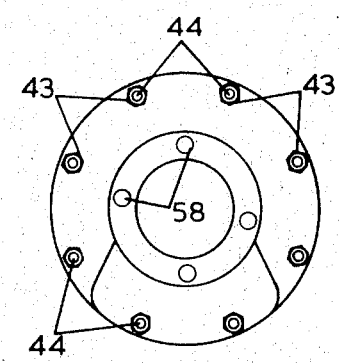
FIGURE 4 is an end elevation taken in the direction of arrow 4 in FIGURE 3.
Figure 5:
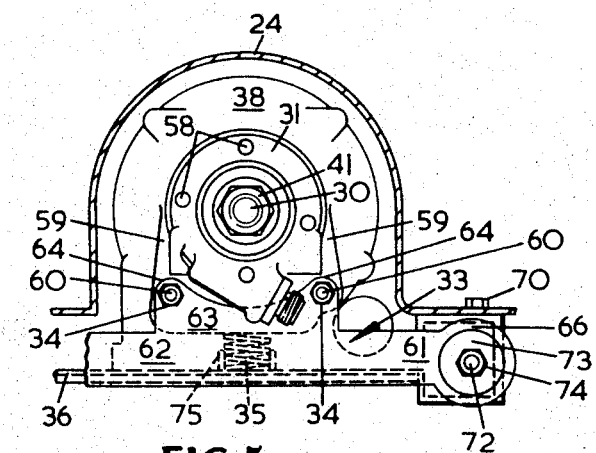
FIGURE 5 is an end elevation taken in the direction of arrow 5 in FIGURE 3.

Now referring to FIGURES 3 to 6, the auxiliary gearing 28 has two main casings 37 and 38 which have a ring 39 sandwiched between them, the ring 39 providing inside the composite casing 37 and 38 an unshown frusto-conical brake surface for the gear-selecting mechanism. The power output shaft 30 is supported within the casing 38 in a conventional manner by an unshown bearing and is drivingly connected to a tubular extension 40 of the driving flange 31 by unshown splines. A nut 41, as shown in FIGURE 5 holds the driving flange 31 axially fast with the power output shaft 30 and an unshown oil seal is arranged between the casing 38 and the cylindrical face of the tubular extension 40.

An end plate 42 is secured to the casing 37 by an arrangement of nuts 43 which coact with studs 44 carried by the casing 37 and extending through bores 45 formed in the end plate 42. The power input shaft 29 is supported by a bearing 46 which is carried by a boss 47 of the end plate 42 so that its outer race 48 is located axially of the latter by an integral lip 49 and an opposing spring clip 50, and the power input shaft 29 is located axially of the bearing 46 as its inner race 51 is trapped between a "circlip" 52 and a shoulder 53 formed integrally with the shaft 29. The forward end of the power input shaft 29 is welded as indicated at 54 to one half of the universal drive coupling 32 of which the other half is provided with a flange 55 for attachment to the driving flange 15. The flanges 31 and 55 are provided, as shown in FIGURE 3, with respective coaxial spigot portions 56 and 57 to ensure alignment and are each provided with four circumferentially-spaced longitudinal bores 58 for fixing bolts as indicated in FIGURES 4 and 5.

Figure 6:
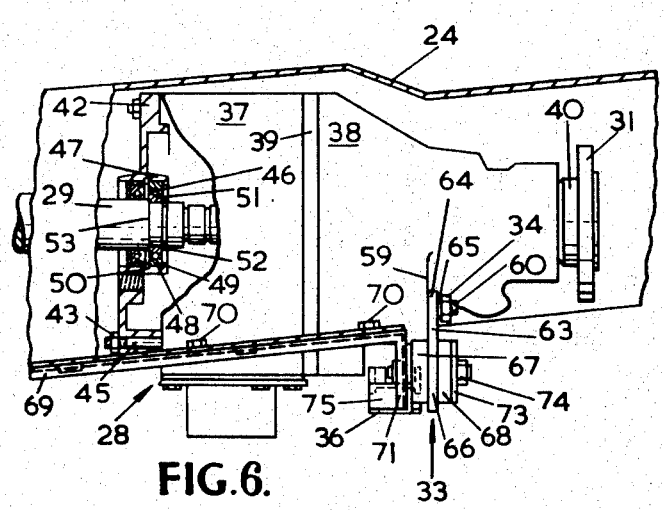
FIGURE 6 is a side elevation of the auxiliary gearing shown in FIGURE 3, part of its casing being broken away to reveal the mounting of the power input shaft.

As is seen best from FIGURES 5 and 6, the casing 38 is provided with two bosses 59 which each support a longitudinally-directed stud 60. The yoke 33 is formed of sheet steel and comprises two transversely-directed extensions 61 and 62 and a central upstanding portion 63 formed with two ears 64, 64 through which the studs 60, 60 extend and coact with respective nuts 34 and lock washers 65 so that the yoke 33 is secured firmly to the casing 38.

The extensions 61 and 62 are each formed remote from the central portion 63 with an enlarged eye 66 provided with an unshown bore which accommodates a rubber mounting plug having two radially-outwardly-directed annular cheeks 67 and 68 which bear against either side of the eye 66. A mounting bracket 69 is secured to each side of the propeller shaft tunnel 24 by bolts 70 as indicated in FIGURE 3. The rearward end of each bracket 69 is downturned as indicated at 71 in FIGURE 6 to serve as an abutment for the corresponding cheek 67, and as a location for a bolt 72 which extends coaxially through the cheeks 67 and 68, the eye 66 and a washer 73 and coacts with a nut 74 to preload the rubber cheeks 67 and 68. In this manner the yoke 33 is resiliently mounted from the vehicle chassis frame both in an axial sense to assist the attachment of the auxiliary gearing 28 to the vehicle chassis, and in a torsional sense so that the torque reaction generated on the ring 39 when the planetary overdrive ratio is engaged will be resiliently resisted.

As will be appreciated best from FIGURES 5 and 6, the bracket 36 is arranged parallel with the yoke 33 and is provided with a short upstanding tubular member 75 for locating the compression coil spring 35 which relieves the weight of the auxiliary gearing 28 from the rubber mountings 67 and 68.

If desired, the auxiliary gearing 28 could be arranged in a similar manner in place of the telescopic driveshaft 19 instead of the driveshaft 17 but, in this case, the yoke 33 should preferably be arranged as near as possible to the centre universal drive coupling 20 so that the angular movement of the shaft 19 would have a minimal effect on the mountings 67 and 68. In this case a telescopic portion could be arranged between the power output shaft 30 and the driving flange 31. An auxiliary gearing installation based on similar lines is shown in FIGURES 7 and 8.

Figure 7:
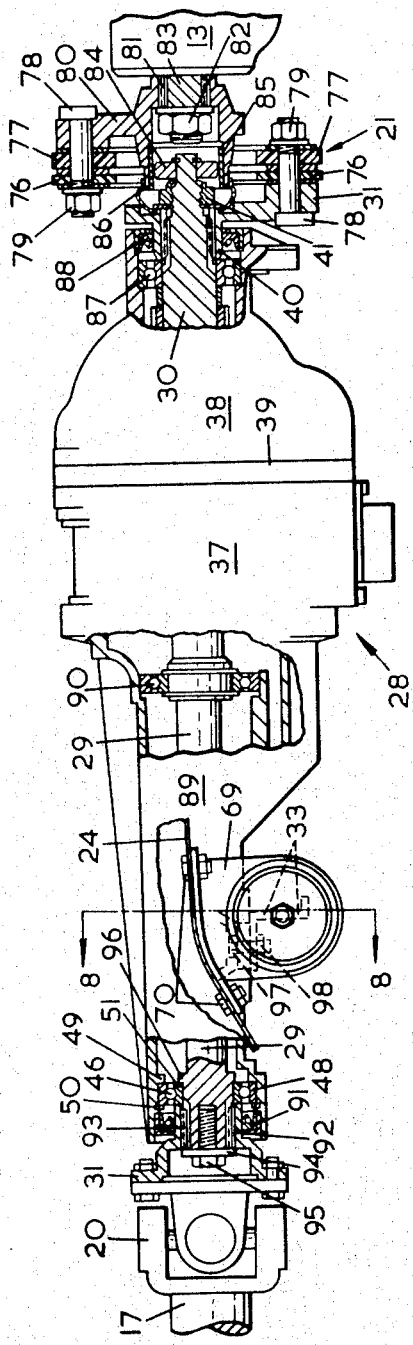
FIGURE 7 is a side elevation of a further form of auxiliary gearing according to the invention with parts of its casing broken away, and arranged in a different position in the vehicular transmission system shown in FIGURE 1.
Figure 8:
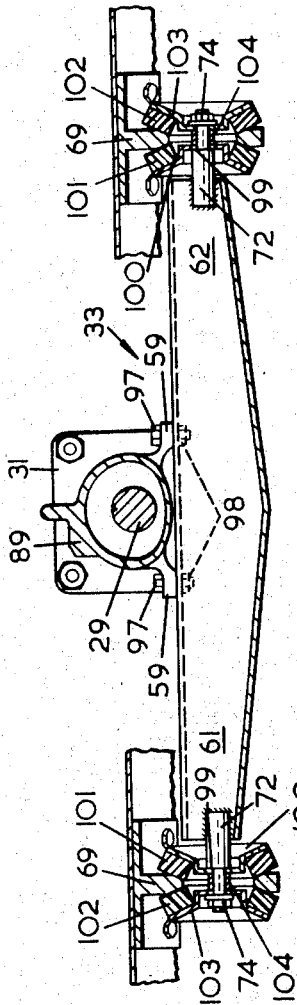
FIGURE 8 is a section taken along the line 8—8 in FIGURE 7.

However, the final drive casing 13 shown in FIGURE 7 is of the type which is resiliently secured by rubber mountings to the vehicle chassis frame and is arranged to drive a pair of independently suspended road wheels. Accordingly the final drive axle will not move up and down with its associated road wheels, and a telescopic splined coupling of the type used in FIGURE 1 is not required. Any slight axial misalignment that may occur is accommodated in the universal drive coupling 21 which utilises two series of rubber drive strips 76, 77 connected by bolts 78 and coacting nuts 79 to the driving flange 31 which takes the form of a three-armed spider, and to a three-armed spider 80 connected by splines 81 and a nut 82 to the power input shaft 83 of the final drive gearing. To maintain the shafts 30 and 83 in alignment or so that their axes lie in a common plane intersecting at a predetermined point, a collar 84 is secured to the shaft 30 and coacts with a sleeve 85 carried by the spider 80. Slight axial movements are accommodated by the collar 84 sliding axially in the sleeve 85, and misalignment of the shafts 30 and 83 is accommodated by forming the periphery of the collar 84 with a part-spherical zone of the same radius. A convoluted rubber seal 86 arranged as shown between the spiders 31 and 80 prevents the ingress of dirt into the sleeve 85. The power output shaft 30 is supported from the casing 38 by a bearing 87 which is located axially between a spacer and the tubular extension 40, and an oil seal 88 is arranged operatively between the casing 38 and the tubular extension 40. On the other hand the power input shaft 29 is supported from a casing 89 secured to the casing 37 by both the bearing 46 and an axially spaced bearing 90, and an oil seal 91 is arranged operatively between the casing 89 and a tubular extension 92 of the driving flange 31. The latter is drivingly secured to the shaft 29 by means of splines 93, a washer 94 and a clamping nut 95 which causes the tubular extension 92 to trap the inner race 51 of the bearing 46 against a flange 96 formed integral with the shaft 29. The yoke 33 is of S-section as shown and has its upper horizontal flange secured by bolts 97 and coacting nuts 98 to the bosses 59 which are formed integral with the casing 89. The bolts 72 are welded to the outer ends of the extensions 61 and 62 and each is formed with a shoulder 99 against which a cap 100 reacts. Each bolt 72 passes through an aperture in the corresponding bracket 69 and a pair of annular rubber mounting blocks 101 and 102 are respectively sandwiched one between the cup 100 and the inner face of the bracket 69, and the other between the outer face of the bracket 69 and a complementary cup 103 which is secured to the bolt 72 by the nut 74. In this manner the yoke 33 is resiliently mounted from the vehicle chassis frame both in an axial sense and in a torsional sense for the reasons described with reference to FIGURES 2 to 6. It will be appreciated that the degree of tightness of the nuts 74 will control the stiffness of the mountings and, for this reason, a spacer 104 is arranged between each pair of cups 100 and 103 to prevent the mountings from being overtightened.

Figure 9:
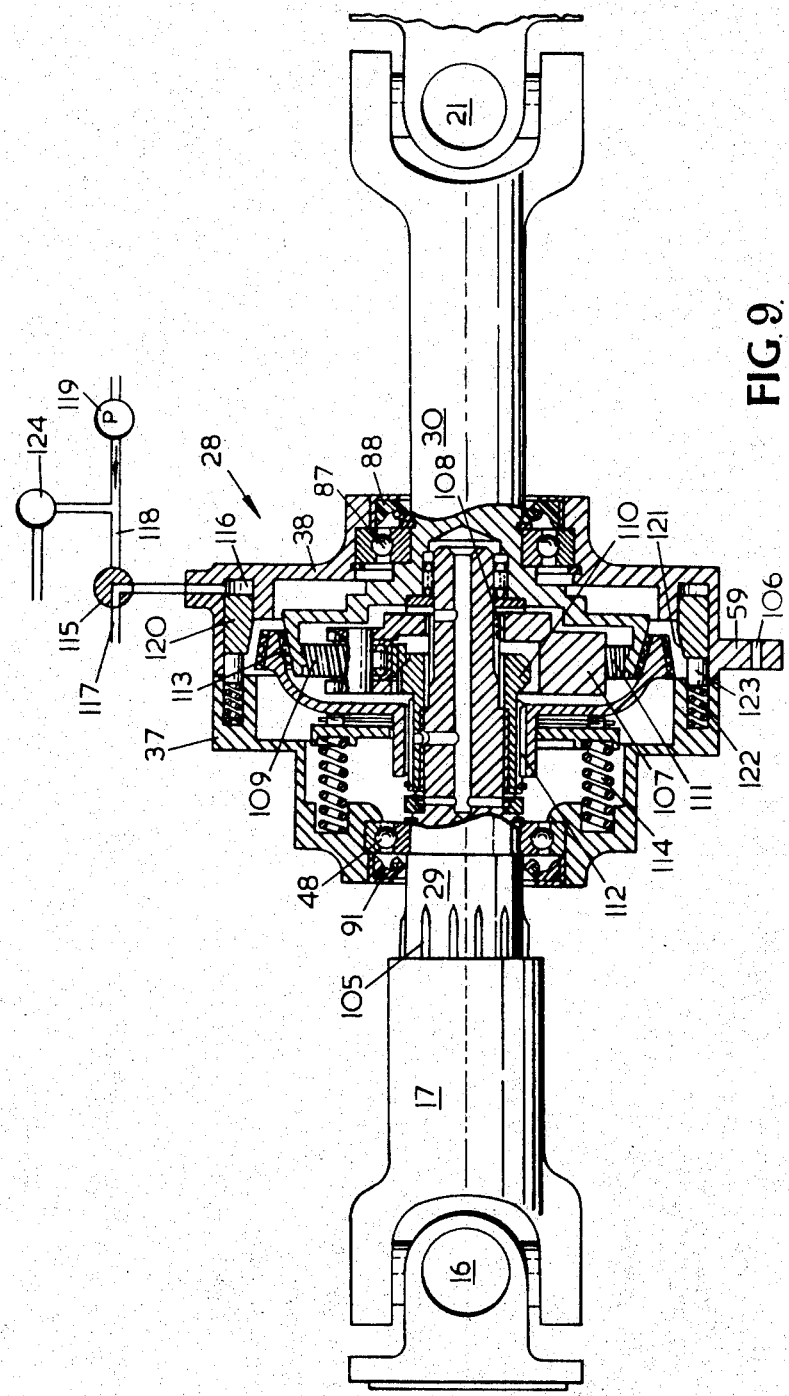
FIGURE 9 is a side elevation shown partly in section of another form of auxiliary change-speed gearing according to the invention.

FIGURE 9 illustrates the arrangement of another form of auxiliary gearing 28 in a telescopic driveshaft. The universal drive coupling 16 is connected to the tubular drive shaft 17, as shown in FIGURE 1, but the shaft 17 is connected by longitudinal splines 105 to the input shaft 29 to the auxiliary gearing thereby forming a telescopic drive coupling. On the other hand the power output shaft 30 from the auxiliary gearing is connected to the universal drive coupling 21. The casing 38 is formed integral with the boss 59 which is provided with an attachment hole 106 for an appropriate steadying yoke such as those already described, or alternatively a reaction linkage pivoted to the chassis frame. The auxiliary gearing has a planet carrier 107 driven by splines 108 from the input shaft 29 and supporting a series of helical planet gear wheels 109 which mesh with a sun gear wheel 110 and an annulus gear wheel 111 formed integral with the output shaft 30. The sun gear wheel 110 is connected by splines 112 to a movable friction engaging member 113 which is biased by a series of compression springs 114 to the position shown in which it clutches the sun gear wheel 110 to the annulus gear wheel 111 to provide the direct drive ratio. When a control valve 115 is operated, from the position shown in which a cylinder 116 is connected to an exhaust passage 117, to the position in which a passage 118 supplied by a pump 119 is connected to the cylinder 116, an annular piston 120 having a brake surface 121 is urged to the left in FIGURE 9 against return springs 122. The annular piston 120 is prevented from rotating by a series of axially directed pins 123 sliding in the casing 37, and the movement of the piston 120 under the action of the fluid pressure in cylinder 116 causes the brake surface 121 to engage the friction engaging member 113, thereby moving the latter out of engagement with the annulus gear wheel 111 to disengage the direct drive ratio, and holding the sun gear wheel 110 against rotation to provide the planetary overdrive ratio. The pressure generated by the pump 119 is regulated by a relief valve 124.

Figure 10:
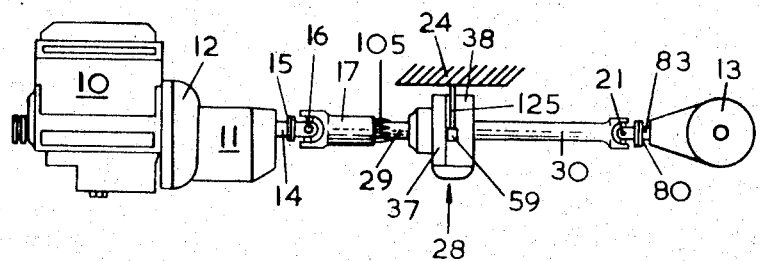
FIGURE 10 is a diagrammatic side elevation of another type of vehicular transmission system showing the positioning of the auxiliary gearing shown in FIGURE 9.

In FIGURE 10, the auxiliary gearing 28 and its associated input and output shafts 29 and 30 and universal drive couplings 16 and 21 are shown connecting the power output shaft 14 of a main gearing 11 to the power input shaft 83 of a final drive axle 13. In this manner the arrangement shown in FIGURE 9 can be substituted for the propeller shaft of a vehicle having a conventional transmission system. If the axle 13 is arranged to drive independently suspended road wheels, the boss 59 may be connected to the chassis frame 24 by means of one of the yokes 33 shown in FIGURES 3 to 8. However, if as shown in FIGURE 10, the axle 13 is to move up and down with the road wheels that it drives, the boss 59 is connected by a reaction linkage which is indicated diagrammatically by reference 125. The linkage 125 must be capable of allowing comparatively free movement of the axle 13 whilst transmitting the torque reaction from the casings 37 and 38 to the chassis. Preferably the auxiliary gearing 28 is arranged as near as possible to the power output shaft 14 of the main gearing 11 and, for this purpose, the telescopic coupling provided by the splines 105 may be arranged in the power output shaft 30 from the auxiliary gearing 28.

Figure 11:
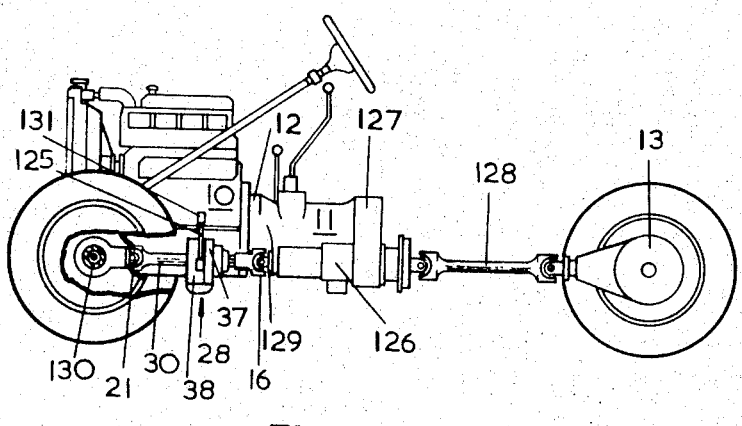
FIGURE 11 is a diagrammatic side elevation of a further type of vehicular transmission system showing the positioning of the auixliary gearing shown in FIGURE 9.

FIGURE 11 shows the application of the arrangement shown in FIGURE 10 to a four wheel drive vehicle in which the main gearing 11 drives a differential gearing 126 through a transfer gearing 127. The differential gearing 126 splits the drive from the transfer gearing between a universally jointed drive shaft 128 connected to the back axle 13, and a driving flange 129 which conventionally drives the front axle 130 through another universally jointed drive shaft. However, in FIGURE 11, the latter drive shaft has been replaced by the arrangement shown in FIGURE 9 so that the driving flange 129 is drivingly connected to the universal drive coupling 16, and the universal drive coupling 21 is connected to drive the front axle 130. The reaction linkage 125 is conveniently connected to a mounting point 131 fast with the side of the engine 10. The function of the overdrive in only one of the drive lines between the differential gearing 126 and the axles 13 and 130 will be understood after FIGURES 12 and 13 have been described. If desired, the auxiliary gearing 28 may be arranged alternatively in the drive to the back axle 13.

Figure 12:
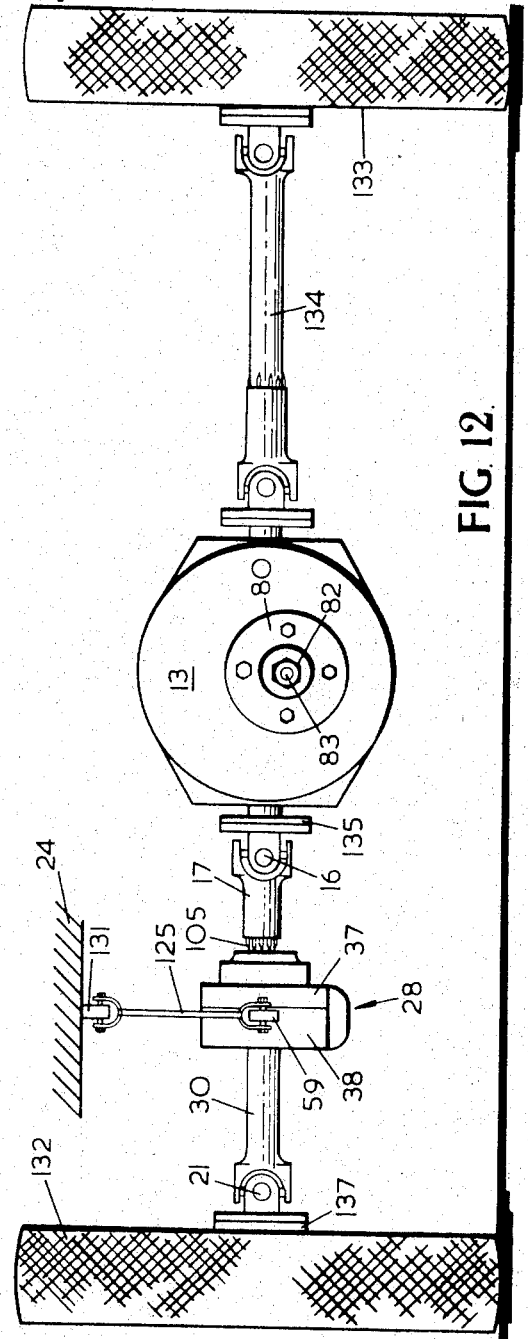
FIGURE 12 is a diagrammatic end elevation of a final drive axle and two independently suspended road wheels, illustrating a further position in which the auxiliary gearing shown in FIGURE 7 can be arranged.
Figure 13:
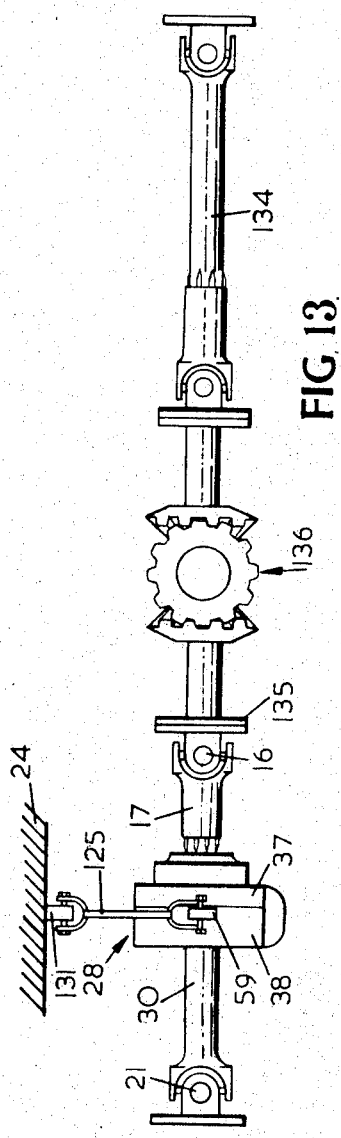
FIGURE 13 is a diagram illustrating the function of the auxiliary gearing in FIGURE 12.

FIGURE 12 shows the application of the arrangement shown in FIGURE 9 to a vehicle having a final drive axle 13 secured resiliently to the vehicle chassis frame 24 and arranged to drive a pair of independently suspended road wheels 132 and 133 through respective universally jointed drive shafts 134. As shown in FIGURES 12 and 13, the universally jointed drive shaft for driving the wheel 132 has been replaced by the arrangement shown in FIGURE 9 so that the corresponding power output flange 135 of the differential gearing 136 arranged in the axle casing 13 is drivingly connected to the universal drive coupling 16, and the universal drive coupling 21 is drivingly connected to the power input flange 137 for the wheel 132. As before the boss 59 is connected by the reaction linkage 125 to a mounting point 131 fast with the chassis frame 24.

Whenever the auxiliary gearing 28 shown in FIGURES 12 and 13 is transmitting drive at the direct ratio, the differential gearing 136 will operate in the usual manner as if the auxiliary gearing were not there. However, when the planetary overdrive ratio is engaged, the differential will still split the torque evenly between the drive shaft 134 to wheel 133 and the shaft 17 driving the auxiliary gearing 24, but the latter causes the wheel 132 to rotate faster than the shaft 17 and the differential will also allow the wheel 133 to be driven correspondingly faster than the shaft 17. Under these circumstances, both wheels 132 and 133 will be driven faster than when the unit ratio of the auxiliary gearing 28 is engaged, but it must be borne in mind that the overdrive ratio at which the wheels 132 and 133 are driven will be half the overdrive ratio provided by the auxiliary gearing 28 due to the action of the differential 136. Thus, the auxiliary 28 must be designed to give twice the ratio that is required at the road wheels. Due to the equal splitting of torque by the differential between the shafts 17 and 134, and the speed change provided by the auxiliary gearing 28, less torque will be applied to the wheel 132 than is applied to the wheel 133.

Referring again to FIGURE 11, it will be appreciated that the auxiliary gearing 28 arranged in the drive to the front axle 130 will also cause the rear axle 13 to be overdriven and that the ratio of the auxiliary gearing will again have to be twice that required at the road wheels.

Although the invention has been described with particular reference to some forms of auxiliary gearing, it should be realised that the teaching of this invention is not restricted to any specific form of auxiliary gearing and may, if desired, be applied to any other form of auxiliary gearing. Furthermore, the resilient mountings for transmitting the reaction torque from the auxiliary transmission casing could be connected to any convenient anchorage member forming a part of the vehicle which does not rotate, such as an engine casing or chassis frame.

What I claim as my invention and desire to secure by Letters Patent of the United States is:

1. An axle system for a motor vehicle, including a differential gearing, two power output members driven by said differential gearing, a first road wheel, a drive shaft connected to drive said first road wheel, one of said power output members connected to drive said drive shaft, a second road wheel, an auxiliary change-speed gearing arranged intermediate said second road wheel and the other of said power output members, said auxiliary gearing comprising a casing means completely enclosing said auxiliary gearing, a universal drive coupling, a power input shaft extending from said universal drive coupling into the casing means for driving the auxiliary gearing, the other of said power output members connected to drive said universal drive coupling, a power output shaft for being driven by the auxiliary gearing extending out of the casing means and being connected to drive said second road wheel, bearings supporting the power input and output shafts coaxially from the casing means, oil seals arranged operatively between the casing means and the power input and output shafts, an anchorage member secured to said motor vehicle and resilient mounting means resiliently interconnecting the casing means and said anchorage member to resist the torsional reaction to be generated by the auxiliary gearing on the casing means.

2. A power transmission system for a motor vehicle, including a prime mover, a main change-speed gearing driven by said prime mover, a first final drive axle gearing, a second final drive axle gearing, a differential gearing driven by said main change-speed gearing, two power output members driven by said differential gearing, drive means connecting one of said power output members to drive said first final drive axle gearing, an auxiliary change-speed gearing arranged intermediate said differential gearing and said second final drive axle gearing, said auxiliary gearing comprising a casing means completely enclosing said auxiliary gearing, a universal drive coupling, a power input shaft extending from said universal drive coupling into the casing means for driving the auxiliary gearing, the other of said power output members connected to drive said universal drive coupling, a power output shaft for being driven by the auxiliary gearing extending out of the casing means and being connected to drive said second final drive axle gearing, bearings supporting the power input and output shafts coaxially from the casing means, oil seals arranged operatively between the casing means and the power input and output shafts, an anchorage member secured to said motor vehicle and resilient mounting means resiliently connecting the casing means to the said anchorage member to resist the torsional reaction to be generated by the auxiliary gearing on the casing means.

References Cited
UNITED STATES PATENTS

| | | | |
|---|---|---|---|
| 1,351,084 | 8/1920 | Winther | 180—44 |
| 1,533,531 | 4/1925 | White | 180—70 |
| 1,613,683 | 1/1927 | Utz | 180—70 |
| 1,812,801 | 6/1931 | Nus | 180—44 |
| 2,475,487 | 7/1949 | Ennis | 180—73 |
| 1,413,943 | 4/1922 | Snyder. | |
| 1,596,480 | 8/1926 | Cosgrove et al. | 180—70 |
| 1,792,485 | 2/1931 | Fawick. | |
| 2,328,518 | 8/1943 | Wahlberg | 180—64 |

A. HARRY LEVY, *Primary Examiner.*